C. J. REILING.
SHEARING AND PUNCHING MACHINE.
APPLICATION FILED JAN. 25, 1908.
903,773.
Patented Nov. 10, 1908.
2 SHEETS—SHEET 1.
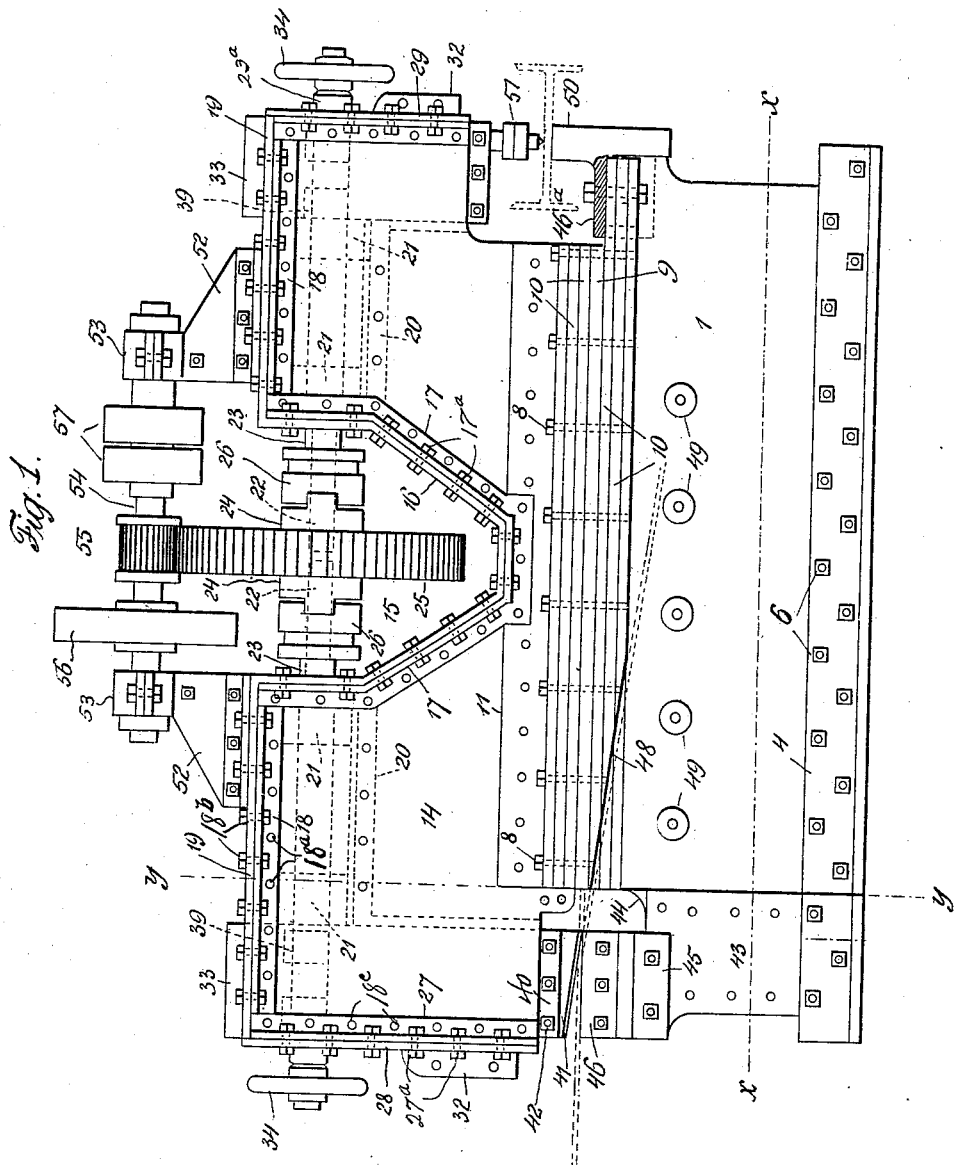
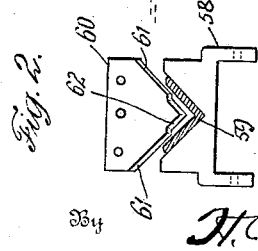
Witnesses
A. H. Rahsag
O. F. Butler
Inventor
C. J. REILING,
By H. C. Everett
Attorneys

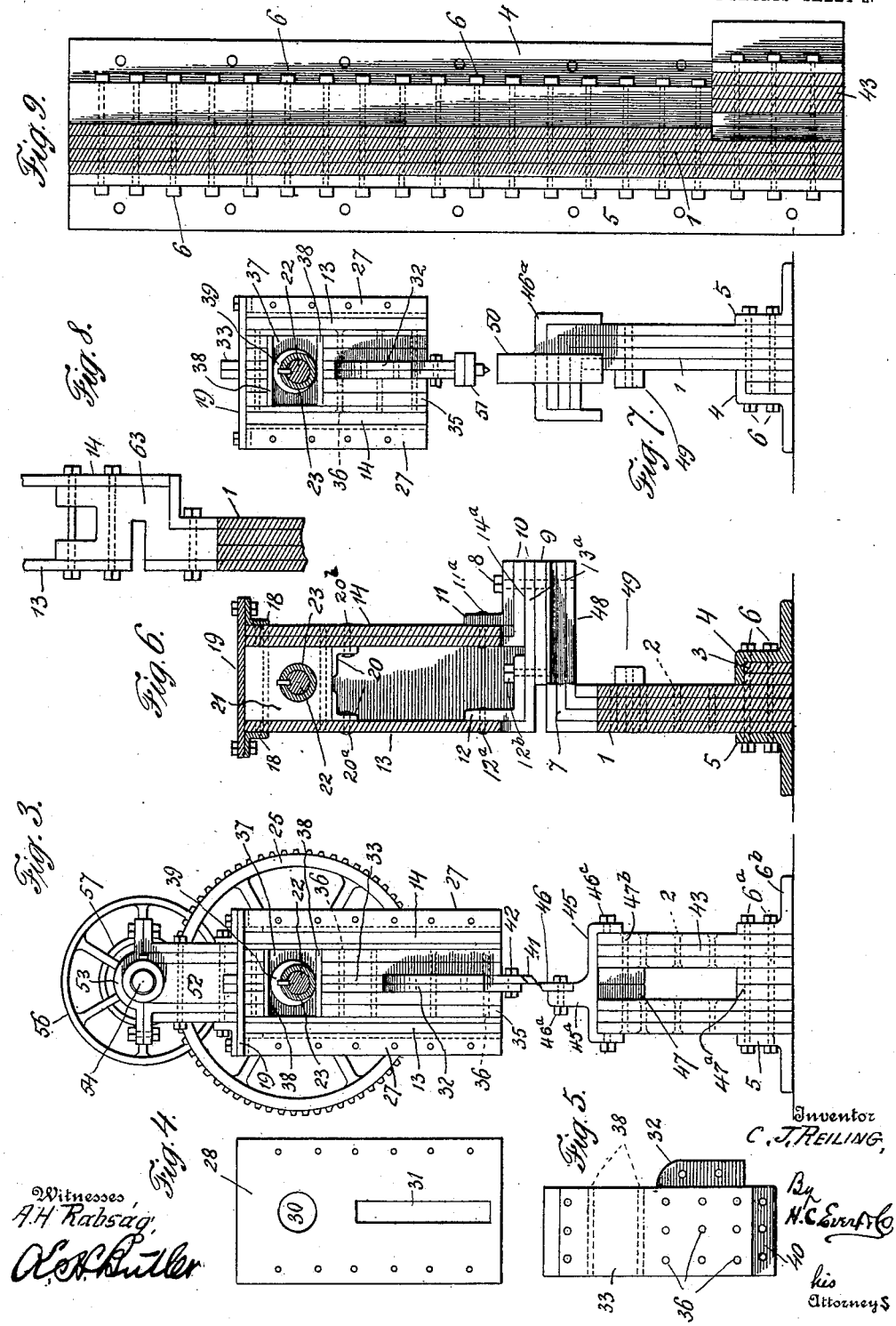

UNITED STATES PATENT OFFICE.

CHARLS JOHN REILING, OF PITTSBURG, PENNSYLVANIA, ASSIGNOR TO MARY EMMA REILING, OF PITTSBURG, PENNSYLVANIA.

SHEARING AND PUNCHING MACHINE.

No. 903,773.  Specification of Letters Patent.  Patented Nov. 10, 1908.

Application filed January 25, 1908. Serial No. 412,643.

*To all whom it may concern:*

Be it known that I, CHARLS JOHN REILING, a citizen of the United States of America, residing at Pittsburg, in the county of Allegheny and State of Pennsylvania, have invented certain new and useful Improvements in Shearing and Punching Machines, of which the following is a specification, reference being had therein to the accompanying drawing.

This invention relates to shearing and punching machines, and the primary object of my invention is, to construct a machine of the above type of a plurality of structural units that can be easily and quickly assembled, to provide a strong and durable machine, capable of withstanding the stresses and strains to which the same is subjected, when in operation.

A further object of my invention is to provide a novel machine wherein large plates can be sheared.

A still further object of this invention is to provide a shearing and punching machine that can be operated by steam or electricity or as a hand machine.

To this end, I have devised a machine constructed principally of steel plates, channel bars, angle bars, and metallic braces, all riveted and bolted together, to insure rigidity, durability and efficiency. The plates or units of the machine are made of such a size as to be easily handled, thus permitting of the machine being easily transported in pieces, and quickly assembled.

With the above and other objects in view which will more readily appear as the invention is better understood, the same consists in the novel construction, combination and arrangement of parts to be hereinafter described.

In the drawings:—Figure 1 is a side elevation of a machine constructed in accordance with my invention, Fig. 2 is an elevation of a shearing blade and support employed for cutting angle bars or plates, Fig. 3 is a view of the shearing end of the machine, partly in section, Fig. 4 is a front elevation of a base plate, Fig. 5 is a similar view of a winged plate to which a shearing blade is secured, Fig. 6 is a vertical sectional view of my machine taken on the line $y$—$y$ of Fig. 1. Fig. 7 is a view of the punching end of the machine, partly broken away, Fig. 8 is an elevation of a steel filler block that can be used in connection with extremely heavy machines, and Fig. 9 is a horizontal sectional view taken on the line $x$—$x$ of Fig. 1 of the drawings.

Referring to the drawings in detail, the reference character 1 denotes a plurality of vertically disposed plates riveted together as at 2. One of the plates 1 is of less length than the other of said plates as clearly shown in Fig. 9 of the drawings. The short plate is what is termed the inner plate of the series. Abutting against the lower portion of the said inner plate is a series of reinforcing plates 3 and inclosing said reinforcing plates 3 and abutting against the inner plate of said series is a Z-bar 4. Abutting against the outer plate of the series of plates 1 is an angle bar 5. The latter, Z-bar 4, plates 3 and plates 1 are secured together by the bolts 6. The Z-bar 4 as well as the angle bar 5 can be secured to a suitable bed or foundation (not shown). The plates 3 are of a length equal to the inner plate of the series of plates 1. The plates 1 and 3, Z-bar 4 and angle bar 5 constitute the base of the machine. The plates 1 of the series of plates with the exception of the inner plate have their upper ends bent at right angles as at 17 to form an inwardly extending shelf upon which is mounted a spacer block 9.

Arranged above the shelf 7 is a vertically extending housing comprising the side plates 13 and 14, a single plate 13 being employed and a pair of plates 14. The plate 13 at its lower end is bent in an angular manner as at 13ᵃ and is mounted upon the spacer block 9. The inner plate 14 is bent at its lower end in an angular manner as at 14ᵃ and is mounted upon the end 13ᵃ of the plate 13. The other plate 14 is supported at its lower edge upon the portion 14ᵃ of the inner plate 14. The plate 13 is reinforced by an interiorly arranged angle bar 12 which is riveted as at 12ᵃ to the plate 13 and is connected by the hold fast devices 12ᵇ to the shelf 7. In this connection, it will be stated that the hold fast devices 12ᵇ extend through the angle bar 12, spacer block 9 and shelf 7. The plates 14 are reinforced through the medium of an angle bar 11 which is riveted to the said plates 14 as at 11ᵃ. The angle bar 11ᵃ is connected with the shelf 7 through the medium of the hold fast devices 8, these latter devices extend through the angle bar 11, angular portion 14ª of a plate 14, spacer block 9 and shelf 7.

The housing plates 13 and 14 are cut away intermediate their ends to provide a wheel pit 15, the edges of the cut-away portions of the plates 13 and 14 being flanged as at 16 and secured to the flanged edges of said plates are angle bars 17. These bars extend entirely around the pit and the hold fast devices for securing the bars 17 to the flanges 16 are indicated by the reference character 17ª. (See Fig. 1.) To the upper edges of the plate 13 and the outer plate 14 are secured the longitudinally extending angular bars 18 through the medium of the hold fast devices 18ª and bolted or otherwise secured to the angle bars 18 through the medium of the hold fast devices 18ᵇ are the cover plates 19.

Arranged within the housing are a pair of angle brackets 20 (see Fig. 1). One of these brackets is positioned against the inner face of a plate 13 and riveted thereto as at 20ª and the other of these brackets is arranged against the inner face of the inner plate 14 and riveted to the plates 14 as at 20ᵇ. The brackets 20 are arranged above the longitudinal center of the housing. The brackets 20 constitute supports for bearing blocks 21, one of these blocks are arranged at each side of the wheel pit. In each of the blocks 21 is journaled a longitudinally extending shaft 22 and slidably keyed on and rotating with each of the shafts 22 is a sleeve 23. The shafts 22 are of a length as to extend into the wheel pit 15 and the confronting ends thereof terminate in the clutch members 24 of a relatively large gear wheel 25 positioned within the pit 15. The sleeves are of a length as to project into the wheel pit and each has that end which is arranged in the wheel pit provided with a clutch member 26 adapted to interlock with a clutch member 24 of the gear wheel 25 whereby a shaft 22 is operatively connected with the gear wheel 25 so that when the gear wheel 25 is rotated the coupled shaft will be revolved.

The ends of the plate 13 and the outer plate 14 of the housing are provided with vertically extending angle bars riveted as at 18ᶜ and folded or otherwise secured to the bars 27 through the medium of the hold fast devices 27ª are the vertically extending end plates 28 and 29, the plate 28 being of less height than the plate 29 and each of said end plates is provided with a vertically extending elongated slot 31 and an opening 30, the latter being arranged above and in vertical alinement with respect to the slot 31.

The slots 31 in the end plates 28 and 29 have extending therethrough, the wings 32 which project laterally from a plurality of plates 33 to be presently referred to. The openings 30 constitute means for the passage of the outer ends of the sleeves 23, the said outer ends being indicated by the reference character 23ª and are provided with handles 34 or other equivalent means whereby said sleeves can be longitudinally adjusted upon the shafts 22 so as to couple the shafts 22 with the gear wheel 25 when occasion so requires.

Arranged between the plates 13 and 14 at the left hand end of the machine which will be hereinafter termed the shearing end, are located the vertically extending plates 33 which have their outer ends formed with the wings 32, these latter extending through the slot 31 in the plate 28.

Arranged at each side of the plates 33 are spacer plates 35, these latter being riveted to the former as at 36. The upper portion of the plates 33 and 35 are cut away as at 37 and the edges formed by the said cut-away portion are projected by the bearing plates 38. Carried by the sleeve 23 is an eccentric 39 which is adapted to engage the bearing plates 38 during the rotation of the sleeve whereby the winged plates 33, and spacer plates 35 will be reciprocated in a vertical direction. One of the winged plates 33 depends below the other and is formed with a flange 40 to which a shearing blade 41 is secured through the medium of the hold fast devices 42.

The base of the machine at the shearing end thereof is reinforced by a plurality of plates 43 which abut against one end of the plates 3 and the Z-bar 4. The plates 43 are spaced from the plates 1 by the plates 47 and 47ª. The plates 43 are of less height than the plates 1; these latter at the shearing end of the machine are cut away as at 44 whereby the edges formed by said cut-away portion of the plates 1 and the top edges of the plates 43 can be connected together by a cap 45 which straddles the plates 1 and 43 and is formed with a vertically extending flange 45ª to which is connected by the hold fast devices 46ª a shearing blade 46. The cap 45 is connected to the plates 1 by the hold fast devices 45ᵇ and to the plates 43 by the hold fast devices 45ᶜ. The plates 43 are connected together by the rivets 2ª and the spacing blocks 47 are connected to the plates 1 and 43 by the hold fast devices 47ᵇ. The spacer plates 47ª are secured to the plates 1 and 43 by the hold fast devices 6ª, these latter devices also attach an angle bar 6ᵇ to the plates 43 and are also connected to the angle bar 5. In order that a large sheet of metal can be sheared by the blades 41 and 46, the shelf 7 is cut away as at 48 and to support the plate which is being sheared or the sheared portions of the plate, a plurality of rollers 49 is arranged upon the outer side of the inner plate 1 directly below the cut-away portion 48. The rollers 49 serve functionally as a table for supporting the sheared plates.

That end of the machine opposite the shearing end thereof constitutes what will be termed the punch end of the machine. This end of the machine is constructed somewhat similar to the shearing end thereof with the exception that it has been found unnecessary to make the same as heavy by reinforcements. The punch end of the machine comprises a cap 46ª secured to the shelf 7 and which is formed with a vertically extending portion 50 constituting a table for supporting the material to be punched.

In lieu of providing one of the winged plates 33 with a shearing blade, a suitable punch 51 is secured thereto. By referring to Fig. 7 of the drawings, it will be noted that at the punching end of the machine, the plates 43 are dispensed with. See also Fig. 9.

Bolted or otherwise secured upon the top plates 19 adjacent to the wheel pit 15 are pedestals 52 in which is journaled a shaft 54. The latter is provided with a pinion 55 which meshes with the gear wheel 25. The shaft 54 also carries a balance wheel 56 and pulleys 57. A suitable belt connection is provided between the pulleys 57 and a source of energy. This belt connection is not shown.

In lieu of the shearing blades 41 and 46 and the cap 45 at the shearing end of the machine, a cap 58 can be employed for supporting angle bars 59 and a blade 60 for the blade 41, the blade 60 having annular cutting edges conforming to the shape of the bar 59. The cutting edges 61 converge to the reinforcing cutter 62 which is adapted to first cut out the angle of the angle bar 59 before the cutting edges 61 completely sever the blades of the angle bar.

In Fig. 8 of the drawings is illustrated a steel filler block 63 designed for heavy machines. The filler block 63 is used as a shelf in lieu of the shelf 7 formed by bending the plates 1 in a manner as hereinafter set forth.

It will be observed from the foregoing description taken in connection with the accompanying drawings that the machine in its entirety is composed of structural units, assembled and reinforced to provide a rigid machine having greater strength and durability than machines constructed by large and cumbersome castings which are easily broken and extremely difficult to handle. The invention is not limited to the precise details of construction as illustrated and described, but it will be understood that any changes, variations or modifications can be resorted to which fall within the scope of the claims hereunto appended.

Having now described my invention what I claim as new, is:—

1. A machine of the character described comprising a plurality of vertically extending plates having angular portions to constitute a shelf, a plurality of reinforcing plates arranged against one side of said vertically extending plates, a Z-bar inclosing said reinforcing plates, an angle bar arranged against the opposite side of said vertical plates, means for connecting the angle bar, Z-bar and vertical and reinforcing plates together, a housing supported upon and secured to said shelf, said housing cut away to provide a wheel pit, a gear wheel arranged in the pit and provided with clutch members, shafts journaled in the housing and terminating in said clutch members, longitudinally adjustable sleeves mounted upon said shafts and provided on their inner ends with clutching members adapted to engage the clutch members of the gear wheel whereby said sleeves will be rotated, said sleeves keyed to the shafts and capable of a longitudinal and a rotative movement, a reciprocatory head mounted at each end of the housing, eccentrics carried by said sleeves and engaging the heads for reciprocating them, a shearing blade carried by one head, a punch carried by the other of said heads, a shearing blade carried by the base, a punch table carried by the base, a roller table supported by the base, and operating means for the gear wheel, said operating means supported upon the housing.

2. A machine of the character described comprising a plurality of vertically extending plates having angular portions to constitute a shelf, a plurality of reinforcing plates arranged against one side of said vertically extending plates, a Z-bar inclosing said reinforcing plates, an angle bar arranged against the opposite side of said vertical plates, means for connecting the angle bar, a Z-bar and vertical and reinforcing plates together, a housing supported upon and secured to said shelf, said housing cut away to provide a wheel pit, a gear wheel arranged in the pit and provided with clutch members, shafts journaled in the housing and terminating in said clutch members, longitudinally adjustable sleeves mounted upon said shafts and provided on their inner ends with clutching members adapted to engage the clutch members of the gear wheel whereby said sleeves will be rotated, said sleeves keyed to the shafts and capable of a longitudinal and a rotative movement, a reciprocatory head mounted at each end of the housing, eccentrics carried by said sleeves and engaging the heads for reciprocating them, a shearing blade carried by one head, a punch carried by the other of said heads, a shearing blade carried by the base, a punch table carried by the base, a roller table supported by the base, and operating means for the gear wheel, said operating means supported upon the housing, said shelf cut away at one end to provide a clearance.

3. A machine of the character described comprising a base formed of a plurality of vertically extending plates provided with means to constitute a shelf for supporting a housing, said base further comprising reinforcing plates arranged at one side thereof, certain of said reinforcing plates of greater length than the other, said shorter plates of greater height than said longer plates, a Z-bar for inclosing said elongated plates, an angle bar abutting against said shorter plates, spacing plates between the shorter plates and the vertical plates, said vertical plates cut away at one end whereby the top edges thereof will be flushed with the top edges of said shorter plates, a cap secured to and mounted upon the top of said shorter plates and at the cut-away end of said vertical plates, and means for securing the angle bars, Z-bar and plates together.

4. A machine of the character described comprising a base formed of a plurality of vertically extending plates provided with means to constitute a shelf for supporting a housing, said base further comprising reinforcing plates arranged at one side thereof, certain of said reinforcing plates of greater length than the other, said shorter plates of greater height than said longer plates, a Z-bar for inclosing said elongated plates, an angle bar abutting against said shorter plates, spacing plates between the short plates and the vertical plates, said vertical plates cut away at one end whereby the top edges thereof will be flushed with the top edges of said shorter plates, a cap secured to and mounted upon the top of said shorter plates and at the cut-away end of said vertical plates, means for securing the angle bars, Z-bar and plates together, said shelf cut away at one end, and a cap mounted upon the cut-away end of the shelf.

5. A machine of the character described comprising a base formed of a plurality of vertically extending plates provided with means to constitute a shelf for supporting a housing, said base further comprising reinforcing plates arranged at one side thereof, certain of said reinforcing plates of greater length than the other, said shorter plates of greater height than said longer plates, a Z-bar for inclosing said elongated plates, an angle bar abutting against said shorter plates, spacing plates between the short plates and the vertical plates, said vertical plates cut away at one end whereby the top edges thereof will be flushed with the top edges of said shorter plates, a cap secured to and mounted upon the top of said shorter plates and at the cut-away end of said vertical plates, means for securing the angle bars, Z-bar and plates together, said shelf cut away at one end, and a cap mounted upon the cut-away end of the shelf, said shelf at its opposite end having its lower face cut-away at an inclination to provide a clearance.

6. A machine of the character described comprising a base formed of a plurality of vertically extending plates provided with means to constitute a shelf for supporting a housing, said base further comprising reinforcing plates arranged at one side thereof, certain of said reinforcing plates of greater length than the other, said shorter plates of greater height than said longer plates, a Z-bar for inclosing said elongated plates, an angle bar abutting against said shorter plates, spacing plates between the short plates and the vertical plates, said vertical plates cut away at one end whereby the top edges thereof will be flushed with the top edges of said shorter plates, a cap secured to and mounted upon the top of said shorter plates and at the cut-away end of said vertical plates, means for securing the angle bars, Z-bar and plates together, said shelf cut away at one end, a cap mounted upon the cut-away end of the shelf, said shelf at its opposite end having its lower face cut-away at an inclination to provide a clearance, and means secured to the vertical plates to constitute a roller table.

7. A machine of the character described comprising the combination with a base, of a housing supported thereby and formed of spaced side plates and a pair of top plates suitably secured together, a head plate fixed to each end of the housing and provided with an elongated vertically extending slot and an opening above and in vertical alinement with the said slot, winged plates mounted at each end of the housing and having the wings thereof extending through said slots, spacing plates for the winged plates said spacing plates positioned at each side of the winged plates and riveted together and to the winged plates, said winged plates and spacing plates near their top cut away, reinforcing plates for the edges of said cut-away portions, a bolt connected to the winged plates at each end of the housing, and means engaging with said reinforcing plates for reciprocating the winged and spacing plates.

8. A machine of the character described comprising the combination with a base, of a housing supported thereby and formed of spaced side plates and a pair of top plates suitably secured together, a head plate fixed to each end of the housing and provided with an elongated vertically extending slot and an opening above and in vertical alinement with the said slot, winged plates mounted at each end of the housing and having the wings thereof extending through said slots, spacing plates for the winged plates, said spacing plates positioned at each side of the winged plates and riveted together and to the winged plates, said winged plates and spacing plates near their top cut away, reinforcing plates for the edges of said cut-away portions, a bolt connected to the winged plates at each end of the housing, rotatable shafts journaled in said housing, a gear wheel loosely journaled on the inner ends of said shafts and provided with clutching members, rotatable sleeves capable of being longitudinally shifted and provided on their inner ends with clutching members adapted to engage the clutching members of the wheel whereby the sleeves will be clutched to the wheel, the said sleeves keyed to said shafts, means for operating said gear wheel, and means carried by the sleeves and adapted to engage said reinforcing plates for vertically reciprocating said winged plates and spacing plates at each end of the housing.

In testimony whereof I affix my signature in the presence of two witnesses.

CHARLS JOHN REILING.

Witnesses:
A. H. RABSAIG,
MAX H. SROLOVITZ.